Patented Dec. 2, 1930

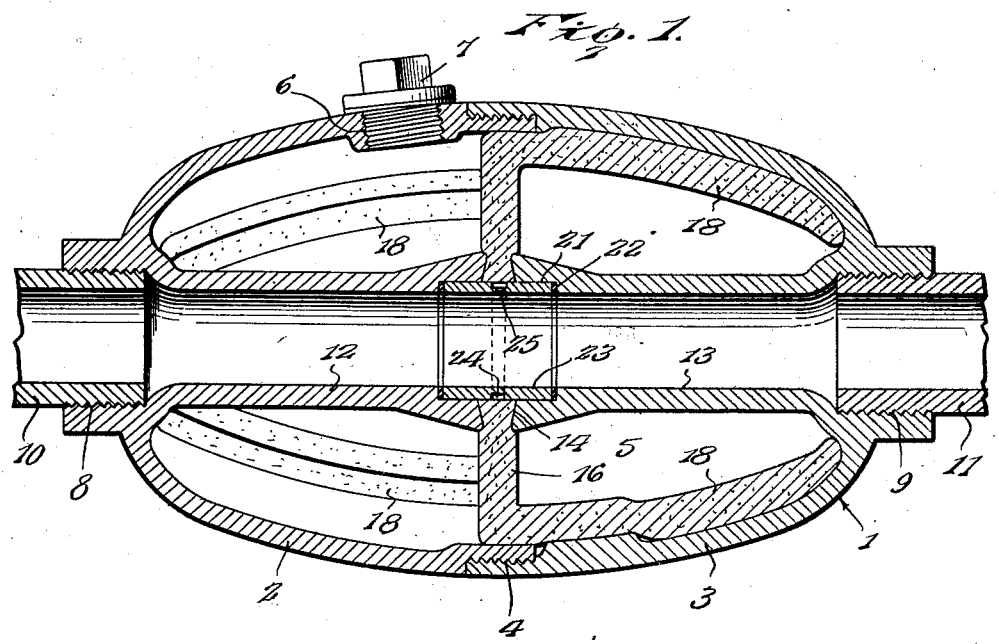

1,783,522

UNITED STATES PATENT OFFICE

JOHN E. RENFER, OF CLEVELAND, OHIO, ASSIGNOR TO THE CLEVELAND ROCK DRILL COMPANY, OF CLEVELAND, OHIO

AIR-LINE OILER

Application filed December 14, 1928. Serial No. 326,059.

The present invention is directed to improvements in air line oilers, and more particularly to improvements in air line oilers of the type disclosed in my prior application Serial No. 295,668, filed July 27, 1928.

The primary object of the invention is to provide a device of this character so constructed that the flow of oil from the reservoir can be conveniently regulated.

Another object of the invention is to provide a device of this nature constructed in such manner that a supply of oil will flow from the reservoir and commingle with the pressure fluid flowing to the drill regardless of the position assumed by the reservoir.

Another object of the invention is to provide a device of this type primarily designed for use in connection with percussive drills in order that an adequate supply of oil will be carried with the pressure fluid into the drill to effectively lubricate the working parts thereof.

In the accompanying drawing:—

Figure 1 is a longitudinal sectional view through the device.

Figure 2 is a face view of the member.

Referring to the drawing, 1 designates a casing which consists of a pair of opposed sections 2 and 3, which are preferably threaded, as at 4, to permit the same to be conveniently connected or disconnected.

The sections 2 and 3 are hollow so that when they are connected a reservoir 5 is produced for receiving oil, there being a filling opening 6 formed in the section 2 and normally closed by a screw plug 7.

The outer ends of these sections are provided, respectively, with sockets 8 and 9, in which the pipe sections 10 and 11 respectively are engaged, said pipe sections serving as means for attaching the casing in the air line.

Formed integral with the said sections 2 and 3 are tubes 12 and 13, which are alined with the pipe sections 10 and 11 in order that an axial air passage will extend through the casing 1, and which are of such diameter that ample space will be provided therearound for containing oil. The opposed ends of the tubes 12 and 13 are beveled, as at 14, the purpose of which will be later explained.

A fabric member 15 is arranged in the casing to feed oil from the reservoir into the air stream passing through the alined tubes 12 and 13. This member consists of a circular body 16 having a central aperture 17 and peripheral extension 18. The latter extend in opposite directions from the body 16 and are arranged to lie along the inner surface of the casing substantially throughout the length thereof. Between certain of the extensions the periphery of the body 16 is formed with notches 19, in order to permit oil to flow from one side thereof to the other.

When the sections 2 and 3 are secured together, the beveled ends 14 of the tubes 12 and 13 engage the body 16 around the aperture 17 and clamp the same in position.

The opposed ends of the tubes 12 and 13 are provided with annular recesses 21 in which are fitted compressible gaskets 22 and against which are engaged the ends of the sleeve 23, said sleeve passing through the opening 17 of the body 16. The sleeve bridges the space between the ends of the tubes and is provided with an annular groove 24 into which opens the port 25 leading from the interior of the sleeve.

It will be apparent that sleeves may be provided wherein the size of the port varies in order that the flow of oil may be conveniently regulated by interchanging the sleeves.

Briefly the operation is as follows:—

Some pressure fluid passing through the alined tubes will pass through the port 25 and seep through the bodies 16, thus building up pressure in the reservoir 5. Upon admission of pressure fluid into the drill, a slight drop in pressure will occur in the air line, and consequently the fluid in the reservoir will expand. This expansion will force oil from the body 16, through the port 25 to commingle with the pressure fluid stream passing through the tubes in order that it will be carried to the drill to lubricate the working parts thereof.

Owing to the presence of the extensions 18 the body will be thoroughly saturated with oil, and owing to their capillary properties, a supply of oil will be maintained at a point to positively mix with the incoming pressure fluid. Should the flow of oil be too great or too little the sleeve can be removed and one substituted having the proper size port.

It will be apparent that even if the supply of oil in the reservoir be low, a sufficient quantity will be fed by capillary attraction in the path of flow of pressure fluid to be carried therewith to the drill, regardless of the position of the reservoir, since at all times parts of the extensions 18 or body 16 will be submerged in oil.

Although the foregoing description is necessarily of a detailed character in order to completely set forth the invention, it is to be understood that the specific terminology employed is not to be construed as restrictive or confining, and that various modifications and re-arrangements of parts may be resorted to without departing from the scope or spirit of the invention as defined in the following claims.

What is claimed is:—

1. An air line oiler comprising a casing constituting an oil reservoir, tubes disposed within the casing for the passage of pressure fluid, a sleeve having an internal diameter as great as the internal diameters of said tubes interposed between the opposed ends of the tubes, said sleeve having a port therein affording communication between the sleeve and reservoir, and a fabric body engaged between the tubes and around the sleeve.

2. An air line oiler comprising a casing constituting an oil reservoir, tubes disposed within the casing and having their opposed ends spaced, a sleeve having its ends fitted in the opposed ends of said tubes, said sleeve having a port therein opening into the reservoir, a fabric body clamped between the ends of the tubes and surrounding the sleeve for conducting oil from the reservoir to the port for discharge into the tubes.

3. An air line oiler comprising a casing constituting a reservoir, tubes extending from the ends of the reservoir for passage of pressure fluid through the reservoir, the opposed ends of said tubes having annular recesses therein, a sleeve having its ends fitted in the recesses, said sleeve having an annular grove formed therein and a port communicating with the groove, and a fabric body engaged between the tubes and surrounding the sleeve for conducting oil, by capillary attraction from the reservoir to the port for discharge into the sleeve.

4. An air line oiler comprising a casing constituting an oil reservoir, tubes disposed within the reservoir and having their opposed ends spaced, said opposed ends having recesses therein, compressible gaskets seated in the recesses, a sleeve disposed between the tubes and having its ends engaged in the recesses and with the gaskets, and a fabric body clamped between the tubes and surrounding the sleeve, said sleeve having a port therein confined by the body.

5. An air line oiler comprising a casing constituting an oil reservoir, tubes extending from the ends of the reservoir for passage of pressure fluid, a sleeve fitted between the ends of the tubes, a fabric body engaged on the sleeve and between the tubes, said body having a plurality of extensions formed thereon and extending in opposite directions within the reservoir, said sleeve having a port therein and confined within the body.

6. An air line oiler comprising an air conduit, an oil reservoir surrounding said conduit, said air conduit having a metered orifice therein communicating with said reservoir, and capillary means for maintaining oil at said orifice irrespective of the position of said reservoir or the quantity of oil therein.

7. An air line oiler including an air conduit, an oil reservoir, and a capillary body for conducting oil from said reservoir to said conduit, said body including a central portion having oppositely extending peripheral extensions.

8. In an air line oiler, a pair of spaced conduits, a sleeve interposed between said conduits, and a fabric body disposed around said sleeve and clamped between said conduits.

In testimony whereof I affix my signature.

JOHN E. RENFER.